Patented Apr. 23, 1940

2,198,223

UNITED STATES PATENT OFFICE 2,198,223

PREPARATION OF CALCIUM CARBONATE

Irving E. Muskat and Frederick Gage, Akron, Ohio, assignors to Pittsburgh Plate Glass Company, Allegheny County, Pa., a corporation of Pennsylvania No Drawing. Application August 10, 1938, Serial No. 224,121

21 Claims. (Cl. 23—66)

This invention relates to a method of making finely divided alkaline earth metal carbonates which are adapted for use as pigments in paint, paper or rubber compositions. In the use of such pigments, the particle size thereof is often of prime importance. For example, ordinary precipitated chalk or other forms of calcium carbonate in which the particle size ranges from 2 to 15 microns or higher, may be incorporated in rubber compositions as a filler but the carbonate acts as a diluent and tends to decrease the tensile and tear strengths of the rubber. On the other hand, calcium carbonate having an average particle size of less than one micron, when incorporated in rubber mixtures has reinforcing characteristics and tends to increase the tensile and tear strength of rubber compositions in which it is introduced.

In the ordinary method of manufacturing finely divided calcium carbonate, a slurry is formed by carefully slaking lime with a predetermined quantity of water and this slurry treated with an alkali metal carbonate under suitably controlled conditions of temperature and agitation. While very finely divided products may be secured in this manner, it is found that the particles vary considerably in size and often an undesirable quantity of pinhead agglomerates or other particles in excess of one micron may be present in the product. These large particles are very undesirable for many purposes, particularly, when the product is to be used as a rubber reinforcing pigment since it may result in the production of products of non-uniform strength and substantially lower tensile and tear resistance.

In accordance with our invention, we have discovered a method of converting relatively coarse alkaline earth metal carbonates into carbonates having an average particle size not in excess of one micron, a preponderance of particles being, in general, not substantially in excess of 0.6 micron. We have found that relatively coarse alkaline earth metal carbonates such as calcium carbonate may be converted into a carbonate of fine particle size by treatment with an alkali metal hydroxide, such as sodium hydroxide, in a simple manner. This product is found to be extremely uniform in size and contains very few, if any, agglomerates. Due to its great fineness and uniform particle size, it is found to be particularly advantageous when used as a pigment in rubber, paint or paper compositions.

In carrying out this process, the relatively coarse carbonate is digested with a relatively concentrated solution of the alkali metal hydroxide in order to cause the two materials to react. The exact nature of the reaction and the products thereof are not known although it is probable that the alkaline earth metal carbonate is converted into a form of the corresponding hydroxide which may be associated in a more or less complex manner with sodium or other alkali metal carbonate or hydroxide. The fact that some reaction does occur, however, is clearly evidenced by the fact that substantial heat is evolved during digestion of the calcium carbonate with the concentrated sodium hydroxide liquor.

The pulp obtained from this treatment may then be treated with water or a dilute alkaline solution and, if desired, a quantity of a suitable carbonate such as sodium or other alkali metal carbonate added to the mixture. This treatment results in the production of a slurry of alkaline earth carbonate made up of very slow settling particles which are usually uniform in size. Upon drying, a carbonate pigment having an average particle size less than one micron, substantially free from undesirable agglomerates, is secured.

In the digestion step, it is preferred to treat the alkaline earth carbonates with a substantial quantity of a highly concentrated aqueous solution of the alkali metal hydroxide. Generally speaking, it is found that with the use of solutions of higher concentration of an alkali hydroxide, such as sodium hydroxide, less sodium hydroxide is required to carry out the reaction than when lower concentrations of the hydroxide are used. In any case, sufficient hydroxide should be used to cause the reaction with the carbonate to proceed substantially to completion. When a solution containing 33 percent by weight of NaOH is used, approximately 4 or more parts by weight of NaOH solution is required to treat one part by weight of calcium carbonate. With more dilute solutions, containing, for example, 25 percent NaOH by weight, 12 or more parts by weight of solution are preferably used, while with the more concentrated solutions, correspondingly less sodium hydroxide is required.

In treating calcium carbonate, the initial concentrations and the amount of sodium hydroxide used should be sufficiently high to insure the presence of a solution of sodium hydroxide having a concentration of not substantially less than 16 percent by weight after reaction of the sodium hydroxide upon the calcium carbonate is completed. If desired, the final concentration of this solution may be somewhat in excess of 16 percent although final concentrations as high as 30–35 percent may be undesirable in some cases due to the fact that somewhat coarser calcium carbonate appears to be produced in such solutions. However, calcium carbonate of suitable particle size has been produced when the final concentration of the solution in the digestion step is 40 percent or higher.

The initial concentration of the hydroxide used in the digestion step may be varied considerably so long as it is sufficiently strong to insure substantially complete reaction. In treatment of calcium carbonate with an alkali metal hydroxide such as sodium hydroxide, the initial concentration of this solution should be in excess of about 20 percent by weight and preferably a solution having a concentration in excess of 25-30 percent by weight is resorted to.

The temperature of the digestion is capable of some variation but it is found that digestion at a temperature above 40° C. appears to result in the production of a superior calcium carbonate. This temperature may be maintained by the heat of the reaction or, if necessary, external heat may be applied. In some cases, an aqueous paste of the carbonate is treated with an alkali hydroxide of high concentration and considerable heat is evolved due to dilution of the hydroxide. This quantity of heat may be sufficient to maintain the preferred temperature for most purposes. The time of treatment is dependent mainly upon the character of carbonate being treated. Thus, the treatment of previously precipitated carbonate such as may be derived from the ordinary lime-soda causticizing operation may be completed in a very short time while treatment of limestone may be somewhat slower. In general, digestion from one-half to four hours is found to yield satisfactory results.

The digestion process is adapted for treatment of any convenient carbonate such as precipitated chalk, calcium carbonate filler derived from the lime-soda process of making sodium hydroxide, limestone, dolomite, or other relatively coarse carbonate which is available for the production of a more finely divided carbonate. Upon completion of the digestion reaction, the solids may be separated from the liquids by suitable means such as filtration or decantation. The liquor may then be reconcentrated, purified, if necessary, by conventional methods and reused for further digestion operations. The separation of the solids from the solution is by no means necessary, however, since the slurry of solids dispersed in the sodium or other alkali metal hydroxide solution may be treated as such for production of fine calcium carbonate in accordance with our invention.

In accordance with our invention, we have found that the solids produced by the digestion step may be subjected to the action of a suitable quantity of water, or an aqueous solution such as an aqueous alkaline solution containing dissolved alkali metal hydroxide or carbonate, and finely divided alkaline earth carbonate having a particle size under one micron may be obtained. While the reactions involved have not yet been ascertained it is believed that the calcium carbonate is formed in fine state by precipitation during the digestion operation. The amount of water used in this repulping operation should be sufficient to insure complete precipitation of the alkaline earth carbonate. During repulping, a quantity of alkali metal hydroxide is generated in the reaction and, in treatment of the pulp derived from digestion of calcium carbonate and sodium hydroxide, the amount of water or alkaline solution used should be sufficient to prevent the concentration of the sodium hydroxide solution from exceeding about 13 percent by weight.

As previously pointed out, it is not necessary to separate the solids from the digestion liquor. While such separation may often be desirable, we have found that a suitable product may be secured by the dilution of all or a portion of the digestion liquor without removal of the solids. In this dilution, the water present should be in such excess that the sodium hydroxide content does not exceed about 13 percent by weight. If desired, a portion of the concentrated sodium hydroxide solution may be removed in a suitable manner, such as by decantation, prior to dilution of the remaining liquor.

In order that a product of uniform particle size be produced, it is preferred that the slurry formed upon addition of water to the solids from the digestion step be vigorously agitated and that the temperature of the slurry be maintained below 60° C. preferably about 15-45° C. If required, a quantity of a suitable carbonate, for example, an alkali metal carbonate such as soda ash or other causticizing agent may be introduced in order to secure complete precipitation of the calcium or other alkaline earth carbonate within a short time of reaction. While the exact amount of soda ash required is capable of considerable variation, it is preferred to introduce a quantity of soda ash such that the causticity of the aqueous liquor after removal of the alkaline earth carbonate from the slurry is about 95 percent or below.

If desired, complete precipitation of the alkaline earth carbonate may be secured by treatment of the slurry with carbon dioxide in lieu of or in conjunction with the addition of alkali metal carbonate. In such cases, it is generally preferred to maintain the temperature of carbonation not in excess of about 50° C.

After precipitation of the carbonate is practically complete, the carbonate may be removed by settling, decantation and/or filtration, washed and dried in the presence of suitable coating agents such as coconut oil or sulphur to prevent agglomeration. The dried product is found to have an average particle size of less than one micron and is substantially free of pinheads. If desired, the drying step may be dispensed with and the carbonate used in the form of a mud.

The aqueous liquor derived from filtration is found to contain about 6-13 percent by weight of sodium hydroxide and more or less sodium carbonate. They may be concentrated for use in the digestion step if desired, or they may be used for repulping further solids derived from the digestion step. Since these liquors contain sodium carbonate dissolved therein, the addition of this material may often be dispensed with by continuously recycling this liquor for use in treating numerous batches of solids derived from the initial digestion. If necessary, the carbonate filter cake may be washed one or more times with an aqueous liquor and in this case, it is generally noted that the wash liquor contains more or less sodium hydroxide and sodium carbonate. These wash liquors may be used for repulping solid derived from the initial digestion step, if desired, or they may be combined with the other liquors for concentration.

The following examples illustrate the invention:

Example I 1730 parts by weight of sodium hydroxide solution having a concentration of 50.7 percent by weight was added to a paste made up of 623 parts by weight of calcium carbonate having a particle size of approximately 2-5 microns and 831 parts by weight of water. The mixture was agitated and maintained at a temperature of about 50-60° C. for about 30 minutes and then cooled to about 25° C. and filtered. The filtrate contained about 18 percent NaOH by weight which closely corresponds to the theoretical concentration which would be secured if all the calcium carbonate reacted with its equivalent weight of sodium hydroxide. The filter cake was then introduced into a solution of 6,000 parts by weight of water containing 250 parts by weight of soda ash and the resultant slurry was vigorously agitated for 45 minutes at a temperature of 20–25° C. The mixture was then filtered and the filter cake, after repeated washing until the product was substantially free of alkali, was repulped in water with 2½ parts by weight of coconut oil and filtered and dried at a temperature of 105° C. The product thereby obtained was calcium carbonate having an average particle size of about 0.4 micron, and was extremely uniform in size, being substantially free of agglomerates.

Example II 623 parts of limestone ground to minus 300 mesh was digested with 831 parts by weight of water and 1740 parts by weight of sodium hydroxide solution having a concentration of 50.4 percent at a temperature of 70–80° C. for four hours. The mixture was then filtered and the filter cake added to 6000 parts by weight of water containing 250 parts by weight of sodium carbonate. The resulting slurry was vigorously agitated at a temperature of 20–25° C. After filtratration, the filter cake was washed and dried in the manner described in Example I. The calcium carbonate thereby obtained had an average particle size of 0.6–0.7 micron.

While the process has been described with particular reference to the use of sodium hydroxide and calcium carbonate, it is to be understood that the process is not so limited since other alkali metal hydroxides such as potassium or lithium hydroxide and other alkali earth carbonates such as barium, magnesium or strontium carbonate may be used in this process. The product is soft and white and is capable of many uses, for example, as pigment or fillers in paint, paper and rubber compositions.

Although the invention has been described with reference to the specific details of certain embodiments thereof, it is not intended that such details shall be regarded as limitations upon the scope of the invention except insofar as included in the accompanying claims.

We claim:

1. The method of preparing an alkaline earth metal carbonate in the form of relatively fine slow settling particles which comprises digesting a relatively coarse alkaline earth metal carbonate with a concentrated solution of an alkali metal hydroxide which is sufficiently concentrated to react with said carbonate, and contacting the solids thereby produced with a substantial quantity of water and recovering the alkaline earth metal carbonate.

2. The method of preparing calcium carbonate in the form of relatively fine, slow settling particles which comprises digesting relatively coarse calcium carbonate with a concentrated solution of an alkali metal hydroxide which is sufficiently concentrated to interact with said carbonate, and contacting the solids thereby produced with a substantial quantity of water and recovering the carbonate.

3. The method of preparing calcium carbonate in the form of relatively fine, slow settling particles which comprises digesting relatively coarse calcium carbonate with a concentrated solution of sodium hydroxide which is sufficiently concentrated to react with said carbonate, and contacting the solids thereby produced with a substantial quantity of water and recovering the carbonate.

4. The method of preparing an alkaline earth metal carbonate in the form of relatively fine, slow settling particles which comprises digesting relatively coarse alkaline earth metal carbonate with a concentrated solution of an alkali metal hydroxide which is sufficiently concentrated to react with said carbonate, and contacting the solids thereby produced with a substantial amount of an aqueous alkaline solution and recovering the alkaline earth metal carbonate.

5. The method of preparing calcium carbonate in the form of relatively fine, slow settling particles which comprises digesting relatively coarse calcium carbonate with a concentrated solution of an alkali metal hydroxide which is sufficiently concentrated to react with said carbonate, and contacting the solids thereby produced with a substantial amount of an aqueous alkaline solution and recovering the alkaline earth metal carbonate.

6. The method of preparing calcium carbonate in the form of relatively fine, slow settling particles which comprises reacting relatively coarse calcium carbonate with a relatively concentrated solution of an alkali metal hydroxide having a concentration such that the solution remains in excess of about 16 percent by weight during the digestion reaction, and contacting the resulting solids with a substantial amount of water to produce a solution of alkali metal hydroxide having a concentration not substantially in excess of about 13 percent by weight and recovering finely divided calcium carbonate.

7. The method of preparing calcium carbonate in the form of relatively fine, slow settling particles which comprises reacting relatively coarse calcium carbonate with a relatively concentrated aqueous solution of sodium hydroxide having a concentration such that the solution remains in excess of about 16 percent by weight of sodium hydroxide during the digestion reaction, and contacting the solids thereby produced with a substantial amount of water to produce a solution of sodium hydroxide having a concentration not substantially in excess of about 13 percent by weight and recovering finely divided calcium carbonate.

8. The method of preparing calcium carbonate in the form of relatively fine, slow settling particles which comprises reacting relatively coarse calcium carbonate at a temperature not substantially less than 40° C. with a relatively concentrated aqueous solution of sodium hydroxide having a concentration not substantially less than about 25 percent NaOH by weight, and contacting the solids thereby produced with a substantial amount of water to produce a solution of sodium hydroxide having a concentration not substantially in excess of 13 percent by weight and recovering finely divided calcium carbonate.

9. The method of preparing an alkaline earth metal carbonate in the form of relatively fine, slow settling particles which comprises digesting a relatively coarse alkaline earth metal carbonate with a concentrated solution of an alkali metal hydroxide which is sufficiently concentrated to substantially completely react with said carbonate, at a temperature not substantially less than 40° C., and contacting the solids thereby produced with a substantial amount of water at a temperature below about 45° C. and recovering finely divided alkaline earth metal carbonate.

10. The method of preparing calcium carbonate in the form of relatively fine, slow settling particles which comprises reacting relatively coarse calcium carbonate with a concentrated solution of sodium hydroxide which is sufficiently concentrated to substantially completely react with said carbonate, at a temperature not substantially less than 40° C., separating the solution from the solids thereby produced and contacting the solids thereby produced with a substantial amount of water at a temperature below about 45° C. and recovering finely divided calcium carbonate.

11. The method of preparing an alkaline earth metal carbonate in the form of relatively fine, slow settling particles which comprises digesting a relatively coarse alkaline earth metal carbonate with a concentrated solution of an alkali metal hydroxide which is sufficiently concentrated to react with said carbonate, and contacting the solids thereby produced with a substantial amount of water at a temperature of about 15 to 45° C. and recovering finely divided alkaline earth metal carbonate.

12. The method of preparing calcium carbonate in the form of relatively fine, slow settling particles which comprises digesting relatively coarse calcium carbonate with a concentrated solution of sodium hydroxide which is sufficiently concentrated to react with said carbonate, and contacting the solids thereby produced with a substantial amount of water at a temperature of about 15 to 45° C. and recovering finely divided calcium carbonate.

13. The method of preparing calcium carbonate in the form of relatively fine, slow settling particles which comprises digesting relatively coarse calcium carbonate with a concentrated solution of an alkali metal hydroxide which is sufficiently concentrated to react with said carbonate, and contacting the solids thereby produced with a substantial amount of an aqueous alkaline solution in the presence of an alkali metal carbonate and at a temperature of 15 to 45° C. and recovering finely divided calcium carbonate.

14. The method of preparing calcium carbonate in the form of relatively fine, slow settling particles which comprises reacting relatively coarse calcium carbonate with an aqueous solution of sodium hydroxide having a concentration not substantially less than about 25 percent by weight and contacting the solids thereby produced with a substantial amount of water to produce a solution of alkali metal hydroxide having a concentration not substantially in excess of about 13 percent by weight at a temperature of about 15 to 45° C. and recovering finely divided calcium carbonate.

15. The method of preparing calcium carbonate in the form of relatively fine, slow settling particles which comprises reacting relatively coarse calcium carbonate with an aqueous solution of sodium hydroxide having a concentration such that the solution remains in excess of about 16 percent by weight of sodium hydroxide during the digestion reaction, and contacting the solids thereby produced with a substantial amount of water to produce a solution of sodium hydroxide having a concentration not substantially in excess of about 13 percent by weight at a temperature of about 15 to 45° C. and recovering finely divided calcium carbonate.

16. The method of preparing calcium carbonate in the form of relatively fine, slow settling particles which comprises reacting relatively coarse calcium carbonate at a temperature not substantially less than 40° C. with an aqueous solution of sodium hydroxide having a concentration not substantially less than about 25 percent by weight and contacting the solids thereby produced with a substantial amount of water to produce a solution of alkali metal hydroxide having a concentration not substantially in excess of 13 percent by weight at a temperature of about 15 to 45° C. and recovering finely divided calcium carbonate.

17. The method of preparing an alkaline earth metal carbonate in the form of relatively fine, slow settling particles which comprises digesting a relatively coarse alkaline earth metal carbonate with a concentrated solution of an alkali metal hydroxide which is sufficiently concentrated to react with said carbonate, diluting the resulting mixture after the digestion is substantially complete with a substantial amount of water at a temperature of about 15 to 45° C. and recovering finely divided alkaline earth metal carbonate.

18. The method of preparing calcium carbonate in the form of relatively fine, slow settling particles which comprises digesting relatively coarse calcium carbonate with a concentrated solution of sodium hydroxide which is sufficiently concentrated to react with said carbonate, diluting the resulting mixture after the digestion is substantially complete with a substantial amount of water at a temperature of about 15–45° C. and recovering finely divided calcium carbonate.

19. The method of preparing an alkaline earth metal carbonate in the form of relatively fine, slow settling particles which comprises digesting a relatively coarse alkaline earth metal carbonate with a concentrated solution of an alkali metal hydroxide, which is sufficiently concentrated to react with said carbonate, diluting the resulting mixture after the digestion is substantially complete with a substantial amount of water and recovering the alkaline earth metal carbonate.

20. The method of preparing calcium carbonate in the form of relatively fine, slow settling particles which comprises digesting relatively coarse calcium carbonate with a concentrated solution of an alkali metal hydroxide which is sufficiently concentrated to react with said carbonate, diluting the resulting mixture after the digestion is substantially complete with a substantial amount of water and recovering the calcium carbonate.

21. The method of preparing calcium carbonate in the form of relatively fine, slow settling particles which comprises reacting relatively coarse calcium carbonate with a concentrated solution of sodium hydroxide which is sufficiently concentrated to substantially completely react with said carbonate, at a temperature not substantially less than 40° C., separating the solution from the solids thereby produced and contacting the solids thereby produced with a substantial amount of water not in excess of 45° C. and recovering finely divided calcium carbonate.

FREDERICK GAGE.
IRVING E. MUSKAT.